United States Patent
Yamada et al.

(10) Patent No.: US 7,300,718 B2
(45) Date of Patent: Nov. 27, 2007

(54) ELECTROLYTE-ELECTRODE JOINED ASSEMBLY AND METHOD FOR PRODUCING THE SAME

(75) Inventors: Takayuki Yamada, Wako (JP); Naoki Kamide, Itabashi-ku (JP); Kazuyuki Yamada, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 279 days.

(21) Appl. No.: 10/982,300

(22) Filed: Nov. 5, 2004

(65) Prior Publication Data

US 2005/0095495 A1 May 5, 2005

(30) Foreign Application Priority Data

Nov. 5, 2003 (JP) .............................. 2003-375577

(51) Int. Cl.
- H01M 8/02 (2006.01)
- H01M 8/10 (2006.01)
- H01M 4/86 (2006.01)

(52) U.S. Cl. .......................... 429/30; 429/44; 427/115

(58) Field of Classification Search ..................... None
See application file for complete search history.

(56) References Cited

U.S. PATENT DOCUMENTS

| | | | | |
|---|---|---|---|---|
| 3,214,648 | A * | 10/1965 | Ross et al. | 361/527 |
| 4,404,267 | A * | 9/1983 | Iacovangelo et al. | 429/41 |
| 4,448,857 | A * | 5/1984 | Iacovangelo | 429/41 |
| 4,500,566 | A * | 2/1985 | Karas et al. | 427/115 |
| 4,507,262 | A * | 3/1985 | Karas et al. | 419/2 |
| 4,567,651 | A | 2/1986 | Karas et al. | |
| 6,228,521 | B1 * | 5/2001 | Kim et al. | 429/33 |
| 2002/0193241 | A1 * | 12/2002 | Jankowski et al. | 502/101 |
| 2003/0178307 | A1 * | 9/2003 | Sarkar | 204/483 |
| 2004/0033405 | A1 * | 2/2004 | Barnett et al. | 429/32 |
| 2004/0043272 | A1 * | 3/2004 | Gorte et al. | 429/33 |
| 2004/0183055 | A1 * | 9/2004 | Chartier et al. | 252/500 |
| 2004/0241531 | A1 | 12/2004 | Biegert et al. | |
| 2005/0019594 | A1 * | 1/2005 | Hunt et al. | 428/469 |
| 2005/0026017 | A1 * | 2/2005 | Seabaugh et al. | 429/30 |

(Continued)

FOREIGN PATENT DOCUMENTS

EP 0414270 A 2/1991

(Continued)

OTHER PUBLICATIONS

Translation of European Patent No. 0 722 193 A1.*

(Continued)

*Primary Examiner*—John J. Zimmerman
(74) *Attorney, Agent, or Firm*—Lahive & Cockfield, LLP; Anthony A. Laurentano

(57) ABSTRACT

A flattening layer is provided between an anode and a solid electrolyte. The flattening layer has a porosity which is set to be smaller than that of the anode. Large diameter pores, which are open at an end surface of the anode on a side facing the solid electrolyte, are filled with the flattening layer, and projections, which bulge out of the end surface, are buried therewith to flatten the projections. Therefore, when the solid electrolyte is formed on the flattening layer, the solid electrolyte is prevented from any depressions and bulges on which stress is concentrated.

13 Claims, 8 Drawing Sheets

U.S. PATENT DOCUMENTS

2005/0095497 A1* 5/2005 Yamada et al. .............. 429/45

FOREIGN PATENT DOCUMENTS

| EP | 0466418 A | 1/1992 |
| --- | --- | --- |
| EP | 0722193 A | 7/1996 |
| JP | 62-086666 | 4/1987 |
| JP | 1-227362 | 9/1989 |
| JP | 5-315000 | 11/1993 |
| JP | 06-119929 | 4/1994 |
| JP | 06-295730 | 10/1994 |
| JP | 2003-173801 | 6/2003 |
| JP | 2003-173802 | 6/2003 |
| WO | WO-03/026035 A2 | 3/2003 |

OTHER PUBLICATIONS

Doklya, M. et al, "Wet Process for Planar SOFC," Proceedings of the Second International Symposium on Solid Oxide Fuel Cells, pp. 127-134 (1991).

International Search Report for Application No. PCT/JP2004/016778, dated Nov. 5, 2003.

* cited by examiner

OPENING DIAMETER = $\dfrac{a+b}{2}$

ELECTROLYTE-ELECTRODE JOINED ASSEMBLY AND METHOD FOR PRODUCING THE SAME

BACKGROUND OF THE INVENTION

1. Field of the Invention

The present invention relates to an electrolyte-electrode joined assembly comprising a first electrode which functions an one of an anode and a cathode, a second electrode which functions as the other of the anode and the cathode, and a solid electrolyte which is interposed between the first electrode and the second electrode, and a method for producing the same.

2. Description of the Related Art

As shown in FIG. 6, a cell, which is provided with an electrolyte-electrode joined assembly 4 comprising a solid electrolyte 3 interposed between an anode 1 and a cathode 2, is one type of an electrochemical cell such as a fuel cell and an oxygen sensor.

For example, in a fuel cell, materials for the anode 1 include, for example, a cermet containing Ni and stabilized zirconia (YSZ) doped with about 8 mole % of $Y_2O_3$ in a weight ratio of 1:1. Materials for the solid electrolyte 3 include, for example, YSZ, and examples of materials for the cathode 2 include a perovskite type oxide such as $LaMnO_3$.

The electrolyte-electrode joined assembly 3 as described above is manufactured as follows. At first, NiO powder and YSZ powder are blended in a weight ratio of 1:1, followed by being pulverized and mixed with a wet ball mill or the like to prepare a slurry.

Subsequently, the slurry is formed into a film, for example, by the doctor blade method or the like. Thus, the anode 1 composed of the mixture of NiO and YSZ is prepared.

Meanwhile, YSZ powder is pulverized with a wet ball mill or the like to prepare a slurry. The slurry is formed into a film, for example, by the doctor blade method or the like in the same manner as described above. Thus, the solid electrolyte 3 composed of YSZ is prepared.

The solid electrolyte 3 manufactured as described above is stacked on one end surface of the anode 1, and both the anode 1 and the solid electrolyte 3 are simultaneously sintered in this state. Accordingly, the anode 1 and the solid electrolyte 3 are joined together.

Subsequently, a slurry of $LaMnO_3$ is applied to one end surface of the solid electrolyte 3 to form a film, for example, by the screen printing method. When the slurry is heated together with the solid electrolyte 3 and the anode 1 in the air atmosphere, the electrolyte-electrode joined assembly 4 is obtained, in which the cathode 2 is fired on the solid electrolyte 3, and the solid electrolyte 3 is interposed between the anode 1 and the cathode 2.

Various investigations have been made about such an electrolyte-electrode joined assembly 4 in order to improve the performance. For example, Japanese Laid-Open Patent Publication No. 6-295730 suggests that an anode has a two-layered structure comprising a lower layer composed of NiO and an upper layer composed of a mixture of NiO and YSZ in order to improve the collecting function of the anode. Meanwhile, Japanese Laid-Open Patent Publication No. 2003-173802 suggests that a reaction-preventive layer composed of $Ce_{1-x}Ln_xO_{2-\delta}$, which has a porosity of not more than 25%, is provided between a solid electrolyte and at least one of an anode and a cathode. According to Japanese Laid-Open Patent Publication Nos. 6-295730 and 2003-173802, the resistance value of the electrolyte-electrode joined assembly is lowered.

In both of the fuel cells as described above, a fuel gas containing hydrogen is supplied to the anode 1, while an oxygen-containing gas containing oxygen is supplied to the cathode 2. In particular, the fuel gas is moved toward the solid electrolyte 3 through pores of the anode 1. The oxygen contained in the oxygen-containing gas combines with the electron in the cathode to produce oxide ion ($O^{2-}$). The hydrogen contained in the fuel gas combines with the oxide ion ($O^{2-}$) having arrived at YSZ contained in the anode from the cathode via the solid electrolyte to produce steam and electrons. The steam is moved to one end surface of the anode through pores of the anode, and the steam is finally discharged from the end surface. Accordingly, the anode 1 is required to be a porous member including pores at a predetermined ratio in order to quickly diffuse the fuel gas supplied to the anode 1 and the produced steam.

As shown in FIG. 7, the anode 1 as the porous member includes recesses 6 which are formed by the pores 5 having openings at the end surface facing the solid electrolyte 3, and projections 7 which bulge out of the end surface. Therefore, when the slurry of the solid electrolyte 3 is thinly applied, then either the solid electrolyte 3 enters the recesses 6, or the solid electrolyte 3 is formed in a state of being stacked on the projections 7. Therefore, the depressions (recesses 8) and the bulges (projections 9) appear on the solid electrolyte 3. If the anode 1 and the solid electrolyte 3 are sintered in this state, stress is concentrated on the recesses 8 and the projections 9 of the solid electrolyte 3, because the coefficient of thermal expansion differs between the recesses 8 and the projections 9. As a result, cracks appear in the solid electrolyte 3, therefore inhibiting the oxide ion conduction, and the power generation characteristics of the fuel cell or the like are deteriorated.

As shown in FIG. 8, the recesses 6 may be filled and the projections 7 may be buried by increasing the thickness of the solid electrolyte 3. However, in this case, the volume resistance or the volume resistivity of the solid electrolyte 3 is increased, and the power generation characteristics of the fuel cell or the like are deteriorated. Further, it is difficult to miniaturize the electrolyte-electrode joined assembly 4, because the thickness of the electrolyte-electrode joined assembly 4 is increased.

No attempts have been made to dissolve the inconvenience concerning the above so for.

SUMMARY OF THE INVENTION

A general object of the present invention is to provide an electrolyte-electrode joined assembly comprising a solid electrolyte which prevents any cracks from forming in spite of a small thickness so that the volume resistance is small and the size is small thereby, and a method for producing the same.

According to an aspect of the present invention, there is provided an electrolyte-electrode joined assembly comprising a solid electrolyte which is interposed between a first electrode and a second electrode, the first electrode functioning as one of an anode and a cathode, and the second electrode functioning as the other of the anode and the cathode, wherein the first electrode is a porous member which has pores for allowing a gas to flow therethrough and which has recesses and projections disposed at an end surface on a side facing the solid electrolyte;

a flattening layer is provided between the first electrode and the solid electrolyte, the recesses being filled therewith, the projections being buried therewith, and the flattening layer having a flat end surface on a side facing the solid electrolyte; and the flattening layer has a porosity which is smaller than that of the first electrode.

The flattening layer fills the recesses, and the flattening layer buries the projections. Accordingly, even when the solid electrolyte having a small thickness is provided on the flattening layer, depressions and bulges are prevented from being formed in the solid electrolyte. Therefore, portions of the solid electrolyte on which stress is concentrated, are significantly decreased for the solid electrolyte. Therefore, the formation of cracks is easily avoided. Accordingly, the thickness of the solid electrolyte is decreased. Therefore, it is possible for ions to move quickly through the solid electrolyte. Consequently, the internal resistance of the solid electrolyte is decreased.

For the reason as described above, it is possible to obtain the electrolyte-electrode joined assembly in which the voltage drop is small. Therefore, for example, even when electric discharge is performed at a large current density, it is possible to obtain a fuel cell which exhibits a large electric discharge voltage.

It is also preferable that the material for the first electrode is the same as the material for the flattening layer. In this arrangement, the interface resistance is decreased between the first electrode and the flattening layer, which is preferred.

It is preferable that the pores, which are included in the first electrode, have opening diameters of 1 to 20 μm in a two-dimensional cross section. In this arrangement, gas is quickly diffused in the first electrode.

In this arrangement, it is preferable that the flattening layer has a thickness of 1 to 20 μm. As described above, in the present invention, it is possible to set the thickness of the flattening layer to be small. Therefore, even when the flattening layer is provided, the size of the electrolyte-electrode joined assembly and consequently the size of the electrochemical cell such as the fuel cell are not increased.

According to another aspect of the present invention, there is provided a method for producing an electrolyte-electrode joined assembly comprising a solid electrolyte which is interposed between a first electrode and a second electrode, the first electrode functioning as one of an anode and a cathode, and the second electrode functioning as the other of the anode and the cathode, the method comprising:

preparing a compact with particles and then presintering the compact to provide the first electrode;

forming a flattening layer in a state in which a porosity of the flattening layer is smaller than that of the first electrode, the flattening layer having a flat and exposed end surface, recesses existing at one end surface of the first electrode being filled therewith, and projections being buried therewith;

forming the solid electrolyte on the flattening layer;

sintering the flattening layer and the solid electrolyte; and forming the second electrode on the sintered solid electrolyte.

Recesses of the first electrode are filled with the flattening layer, projections are buried therewith, and the solid electrolyte is provided on the flattening layer. Accordingly, even when the thickness of the solid electrolyte is extremely small, it is possible to obtain a flat solid electrolyte. When the solid electrolyte as described above is sintered, cracks can be avoided from forming on the solid electrolyte, because the portions, on which stress is concentrated, are decreased. In other words, cracks are prevented from being formed.

In the solid electrolyte in which the amount of cracks is small, it is easy for the ion to move. Therefore, the internal resistance is decreased. Further, the volume resistance of the solid electrolyte is decreased as well, because it is possible to decrease the thickness of the solid electrolyte.

It is preferable that the flattening layer is formed with a material which is the same as a material for the first electrode. Accordingly, it is possible to significantly decrease the interface resistance between the first electrode and the flattening layer.

It is preferable that pores, which have opening diameters in a two-dimensional cross section of 1 to 20 μm, are formed by previously adding a pore-forming agent in advance to the particles which are raw materials for the first electrode and extinguishing the pore-forming agent. In the first electrode having the pores as described above, gas is quickly permeated. Therefore, the electrode reaction is advanced efficiently.

As described above, according to the present invention, the recesses, which exist at an end surface of the first electrode on the side facing the solid electrolyte, are filled with the flattening layer, and the projections, which exist at the end surface, are buried with the flattening layer. Therefore, even when the solid electrolyte, which is provided adjacently to the flattening layer, has a small thickness, hardly any cracks are formed in the solid electrolyte. Therefore, it is possible to obtain the electrolyte-electrode joined assembly in which the internal resistance and the volume resistance are small, and hence the voltage drop is small. Therefore, for example, it is possible to obtain the fuel cell which exhibits excellent power generation performance.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

The electrolyte-electrode joined assembly and the method for producing the same according to the present invention will be explained in detail below with reference to the accompanying drawings as exemplified by preferred embodiments. In the following description, all numerical values of the porosity indicate values obtained after reducing nickel oxide.

Figure 1:
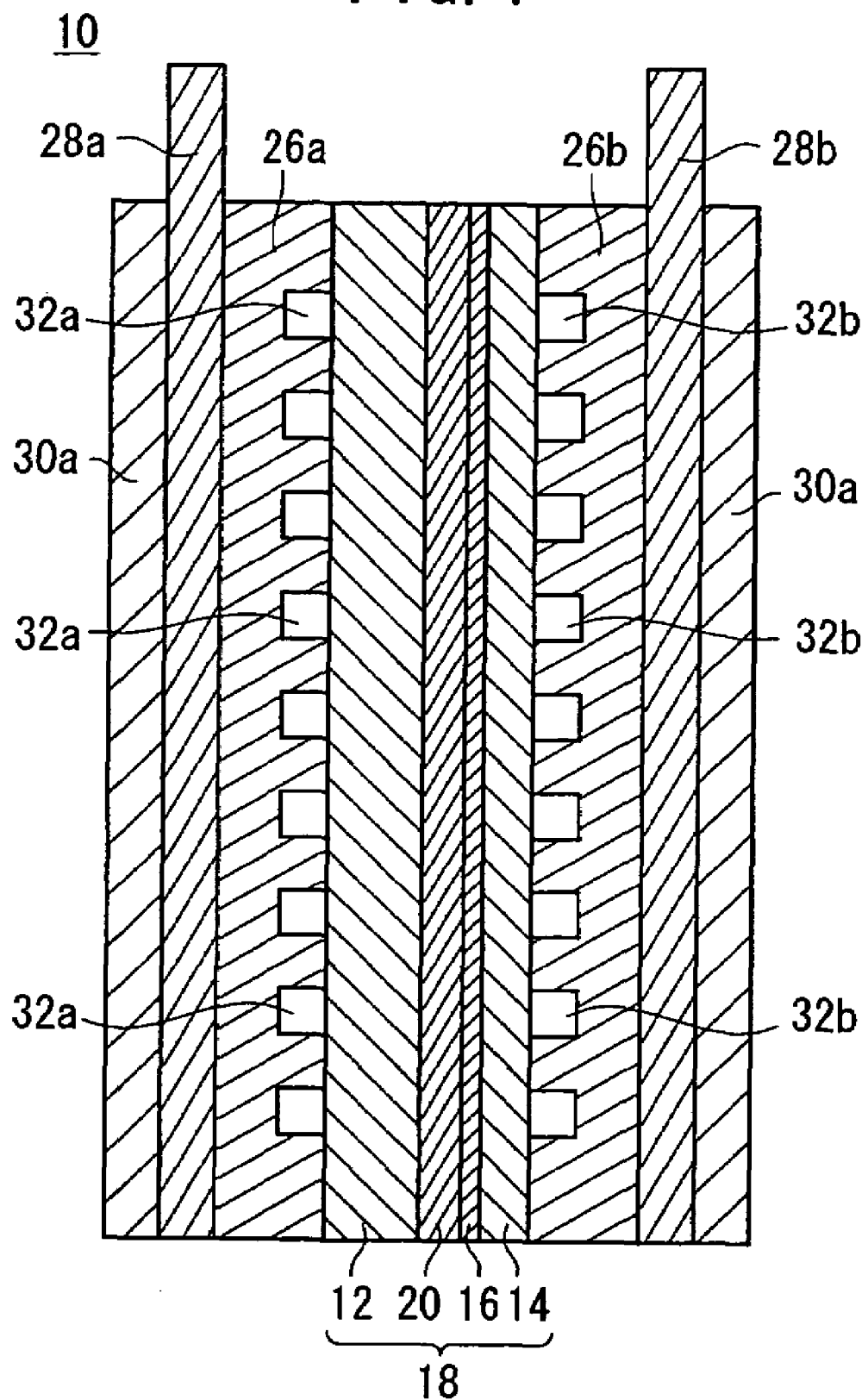
FIG. 1 is a schematic vertical sectional view illustrating a power-generating cell of a fuel cell having an electrolyte-electrode joined assembly according to an embodiment of the present invention.

FIG. 1 shows a schematic vertical sectional view illustrating a power-generating cell of a fuel cell having an electrolyte-electrode joined assembly according to an embodiment of the present invention. The power-generating cell 10 comprises an electrolyte-electrode joined assembly 18 including an solid electrolyte 16 interposed between an anode 12 and a cathode 14, in which these components are joined together. Further, a flattening layer 20 is provided between the anode 12 and the solid electrolyte 16.

In the embodiment of the present invention, the anode 12 is composed of a cermet (sintered product) in which Ni and YSZ are contained at a weight ratio of 1:1, in which the porosity is 20% to 45% by volume, and the thickness is about 1 mm.

Figure 2:
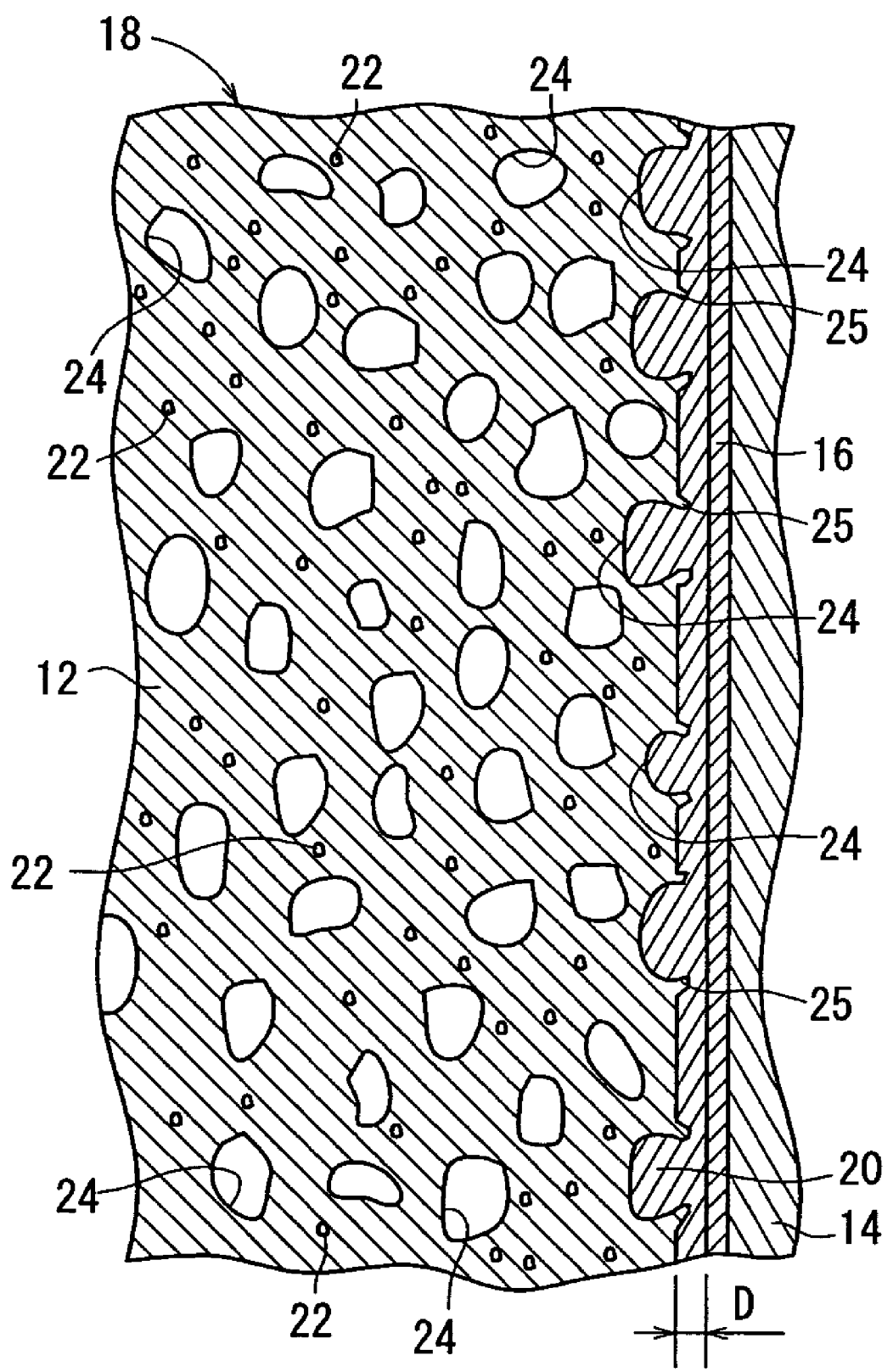
FIG. 2 is a magnified view illustrating major parts shown in FIG. 1.
Figure 3:
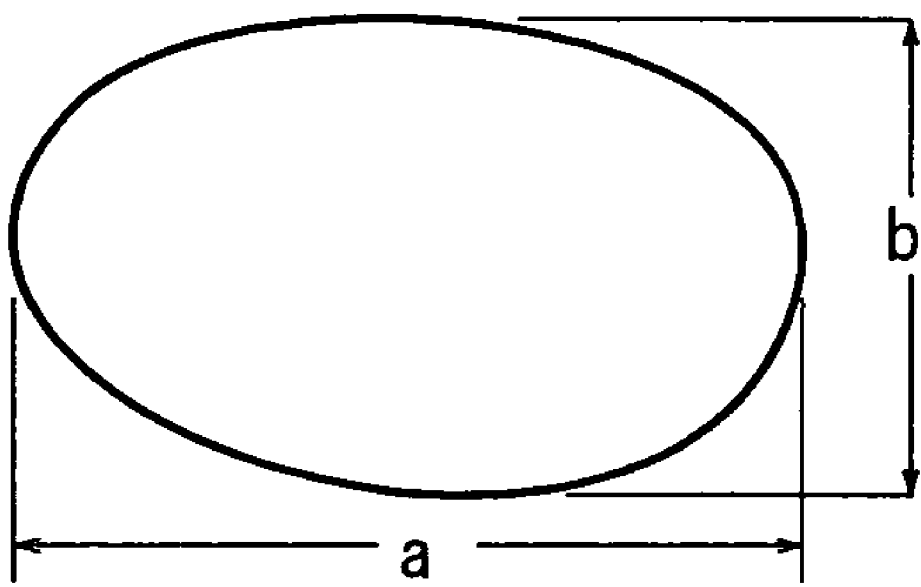
FIG. 3 is a schematic plan view illustrating the opening diameter of the pore.

As shown in FIG. 2, the anode includes small diameter pores 22 and large diameter pores 24. In particular, the small diameter pores 22 are formed by the volume shrinkage in accordance with the reduction of NiO particles, which are raw materials for the anode, into Ni. As shown in FIG. 3, the opening diameter of the small diameter pore 22 as described above is defined as an average value of the longest dimension "a" between both ends in the longitudinal direction of the opening in a two-dimensional cross section and the maximum dimension "b" in the direction perpendicular to the longitudinal direction. The opening diameter of the small diameter pore 22 is approximately within a range of 0.5 to 1 μm.

Meanwhile, the large diameter pore 24 is formed by the disappearance of the pore-forming agent as described later on. Therefore, the opening diameter of the large diameter pore 24 is controlled by setting the average grain size of the pore-forming agent. When the grain diameter distribution of the pore-forming agent is narrowed, it is possible to narrow the opening diameter distribution of the large diameter pore 24. For example, when the pore-forming agent having an average grain diameter of 8 μm is used, the opening diameter of the large diameter pore 24 of the anode 12 is approximately within a range of 4 to 6 μm. When the pore-forming agent having an average grain diameter of 20 μm is used, the pore diameter of the large diameter pore 24 is approximately within a range of 12 to 14 μm. The opening diameter of the large diameter pore 24 is defined in the same manner as the opening diameter of the small diameter pore 22.

In this embodiment, the flattening layer 20, which is provided adjacently to the anode 12, is composed of a cermet containing Ni and YSZ at a weight ratio of 1:1 in the same manner as the anode 12. The porosity thereof is 10% to 20% by volume. That is, the porosity differs between the anode 12 and the flattening layer 20, although the anode 12 and the flattening layer 20 are composed of the same material and the same composition ratio.

The thickness of the flattening layer 20 is set depending on the opening diameter of the large diameter pore 24. For example, when the opening diameter of the large diameter pore 24 is approximately 4 to 6 μm, the thickness is set to be approximately 5 μm. When the opening diameter is approximately 12 to 14 μm, the thickness is set to be approximately 13 μm. When the thickness of the flattening layer 20 is set depending on the opening diameter of the large diameter pore 24, the electrolyte-electrode joined assembly 18 is prevented from being thickened. In other words, the electrolyte-electrode joined assembly 18 and consequently the power-generating cell 10 are not large-sized, even when the flattening layer 20 is provided.

As shown in FIG. 2, the thickness of the flattening layer 20 is set as the distance D from the flat portion at the end surface of the anode 12 to the end surface of the flattening layer 20 on the side facing the cathode 14.

The large diameter pore 24, which is open at the end surface of the anode 12 on the side facing the solid electrolyte 16, has a depth which is smaller than the opening diameter. Further, the thickness of the flattening layer 20 is larger than the opening diameter of the large diameter pore 24. Therefore, the large diameter pores 24 (recesses), which are open on the side of the end surface, are filled with the flattening layer 20. On the other hand, projections 25, which bulge out of the end surface, are covered with the flattening layer 20, and the projections 25 are buried therewith. That is, the end surface of the anode 12, which is disposed on the side facing the solid electrolyte 16, is flatted by the flattening layer 20.

The end surface of the flattening layer 20, which faces the side of the solid electrolyte 16, is formed as a flat surface. That is, the end surface has an extremely small roughness. Therefore, the solid electrolyte 16, which is disposed adjacently to the flattening layer 20, does not enter the recesses of the end surface of the flattening layer 20, and the solid electrolyte 16 is not depressed. Further, the solid electrolyte 16 does not cover the projections 25. Therefore, no bulges are formed on the solid electrolyte 16 as well. That is, the end surface of the solid electrolyte 16, which is disposed on the side facing the cathode 14, is flat.

In this embodiment, the solid electrolyte 16 is composed of YSZ, and the thickness is set to be about 5 μm. The end surface of the solid electrolyte 16, which is disposed on the side facing the cathode 14, is flat as described above. Although the thickness of the solid electrolyte 16 is about 5 μm which is extremely small, the end surface has an extremely small amount of cracks as compared with any electrolyte-electrode joined assembly of the conventional technique which does not have a flattening layer 20.

The remaining cathode 14 is composed of $La_{0.6}Sr_{0.4}MnO_3$ as a perovskite type oxide. The thickness of the cathode 14 is set to be, for example, about 30 μm.

The electrolyte-electrode joined assembly 18, which is constructed as described above, is interposed between a pair of separators 26a, 26b (see FIG. 1). Collecting electrodes 28a, 28b are arranged outside the separators 26a, 26b respectively. Further, end plates 30a, 30b are arranged outside the collecting electrodes 28a, 28b respectively. The end plates 30a, 30b are connected to one another by unillustrated bolts, and the electrolyte-electrode joined assembly 18, the separators 26a, 26b, and the collecting electrodes 28a, 28b are interposed between the end plates 30a, 30b. Thus, the power-generating cell 10 is constructed. Gas flow passages 32a, 32b are formed for the separators 26a, 26b respectively in order to supply fuel gas or oxygen-containing gas to the anode 12 or the cathode 14.

The electrolyte-electrode joined assembly 18 according to the embodiment of the present invention is basically constructed as described above. Next, its function and effect will be explained.

When the power-generating cell 10 constructed as described above is operated, the temperature of the power-generating cell 10 is raised to about 500° to 1,000° C. After that, the oxygen-containing gas containing oxygen is allowed to flow through the gas flow passage 32*b* provided for the separator 26*b*. Meanwhile, the fuel gas containing the hydrogen is allowed to flow through the gas flow passage 32*a* provided for the separator 26*a*.

The oxygen contained in the oxygen-containing gas combines with the electron in the cathode 14 composed of $La_{0.6}Sr_{0.4}MnO_3$ to produce oxide ion ($O^{2-}$). The produced oxide ion is conducted to the solid electrolyte 16 beginning at the cathode 14.

In this embodiment, the end surface of the solid electrolyte 16, which is disposed on the side facing the cathode 14, is flat. Therefore, the contact area is increased between the cathode 14 and the solid electrolyte 16. Accordingly, the interface resistance is decreased between the cathode 14 and the solid electrolyte 16. Therefore, the voltage drop of the electrolyte-electrode joined assembly 18 is decreased.

The oxide ion is subsequently moved to the interface of the solid electrolyte 16 opposed to the anode 12. As described above, the amount of cracks which inhibit the movement of the oxide ion is extremely small in the solid electrolyte 16. In other words, the oxide ion is easily moved through the solid electrolyte 16. That is, it is possible to decrease the thickness of the solid electrolyte 16. Therefore, the oxide ion is quickly moved through the solid electrolyte 16, and the internal resistance of the solid electrolyte 16 is consequently decreased.

As described above, in the embodiment of the present invention, the voltage drop of the electrolyte-electrode joined assembly 18 is small, and the internal resistance and the volume resistance of the solid electrolyte 16 are small. Therefore, even when the power-generating cell is subjected to electric discharge at a large current density, it is possible to obtain a relatively large discharge voltage.

Figure 4:
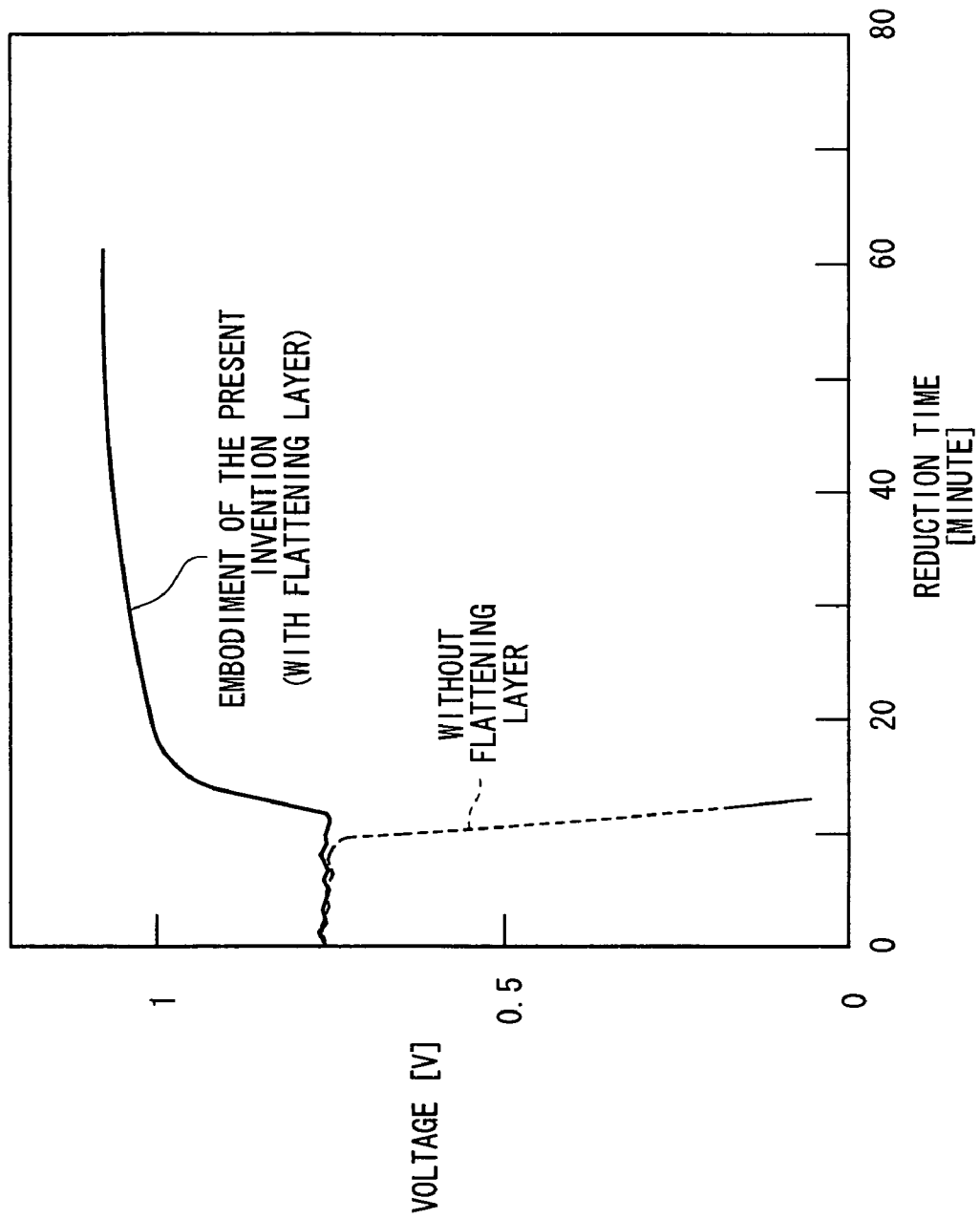
FIG. 4 is a graph illustrating the relationship between the presence or absence of the flattening layer and the electric discharge voltage of the fuel cell.

FIG. 4 shows results of an electric discharge test of the fuel cell provided with the electrolyte-electrode joined assembly 18 of the embodiment of the present invention and a fuel cell provided with an electrolyte-electrode joined assembly constructed in the same manner as the electrolyte-electrode joined assembly 18 of the embodiment of the present invention without the flattening layer 20. In both fuel cells, the thickness of the solid electrolyte 16 is set to be significantly smaller than that of a solid electrolyte of a general solid polymer electrolyte type fuel cell.

As clearly understood from FIG. 4, when the flattening layer 20 is not provided, the voltage is dropped in a relatively short period of time from the starting point, at which the anode 12 is supplied with the fuel gas, i.e., in a short period of reduction time. On the contrary, when the flattening layer 20 is provided, a constant voltage is obtained over a long period of time. Accordingly, it is clear that the fuel cell, which is excellent in the power generation performance, is obtained by providing the flattening layer 20.

The oxide ion is conducted through the anode 12 via the YSZ particles as the constitutive particles of the anode 12 (cermet).

Meanwhile, as for the fuel gas supplied to the anode 12, almost all of the fuel gas is diffused by the large diameter pores 24 while some of the fuel gas is diffused by the small diameter pores 22. The hydrogen, which is contained in the fuel gas and which has entered the pores as described above, is reacted with the oxide ion which are conducted through the YSZ particles as the constitutive particles of the anode. As a result, steam and electrons are released.

The released electron is taken out by an external circuit which is electrically connected to the collecting electrodes 28*a*, 28*b*. The electron is utilized as DC electric energy to energize the external circuit. After that, the electron arrives at the cathode 14 to combine with the oxygen supplied to the cathode 14.

The steam is quickly diffused to the separator 26*a* via the large diameter pores 24 and/or the small diameter pores 22 of the anode 12, and the steam is discharged outside of the system from the gas flow passage 32*a* of the separator 26*a*.

Figure 5:
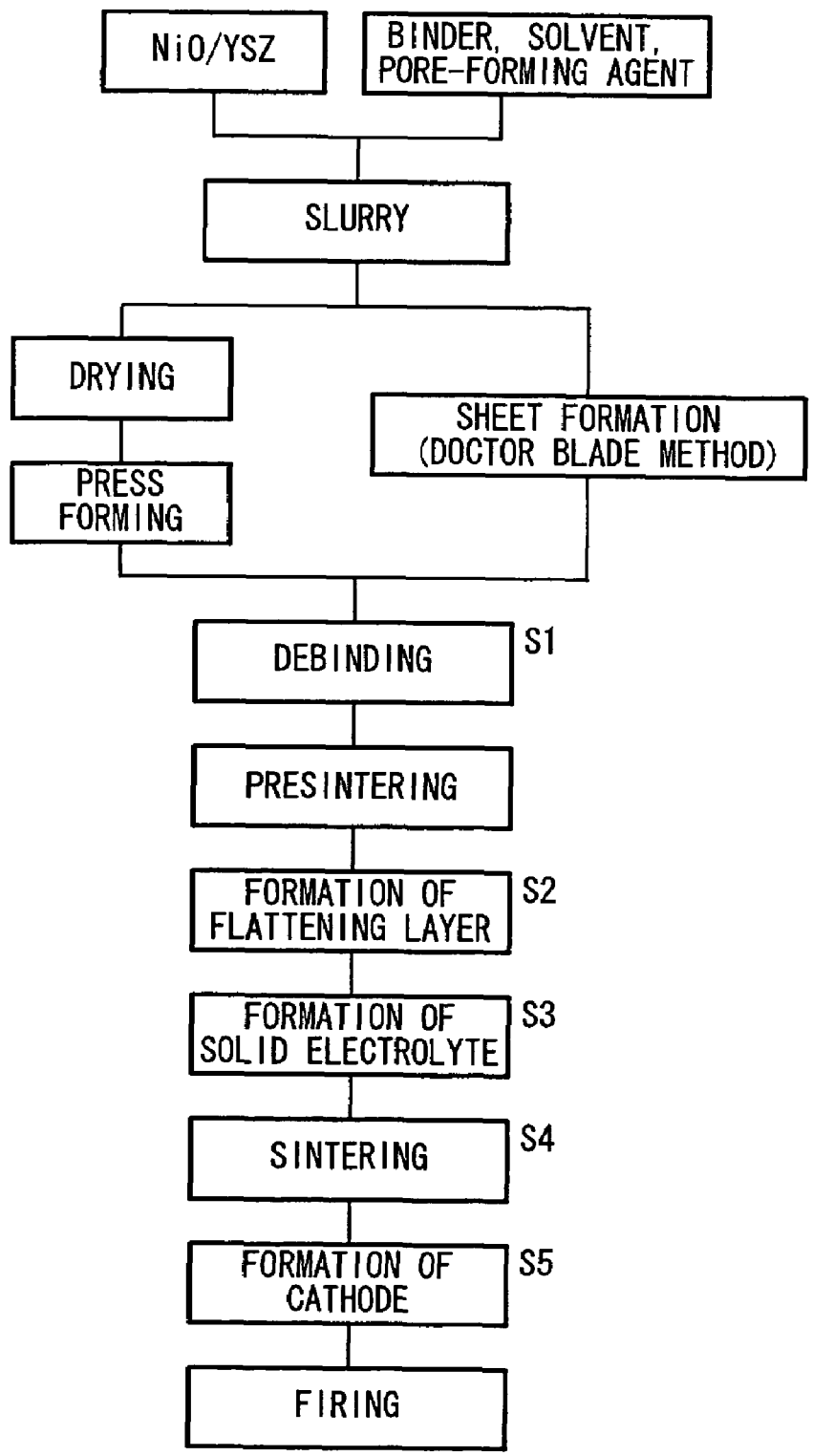
FIG. 5 is a flow chart illustrating a method for producing an electrolyte-electrode joined assembly according to an embodiment of the present invention.
Figure 6:
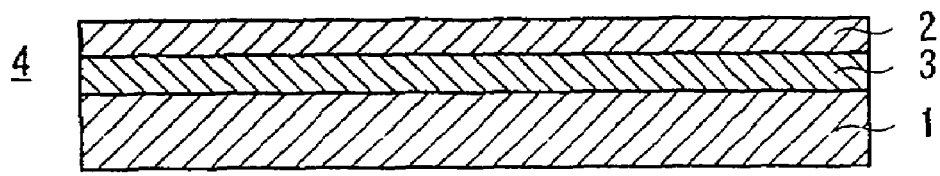
FIG. 6 is a schematic vertical sectional view illustrating an electrolyte-electrode joined assembly concerning the conventional technique.
Figure 7:
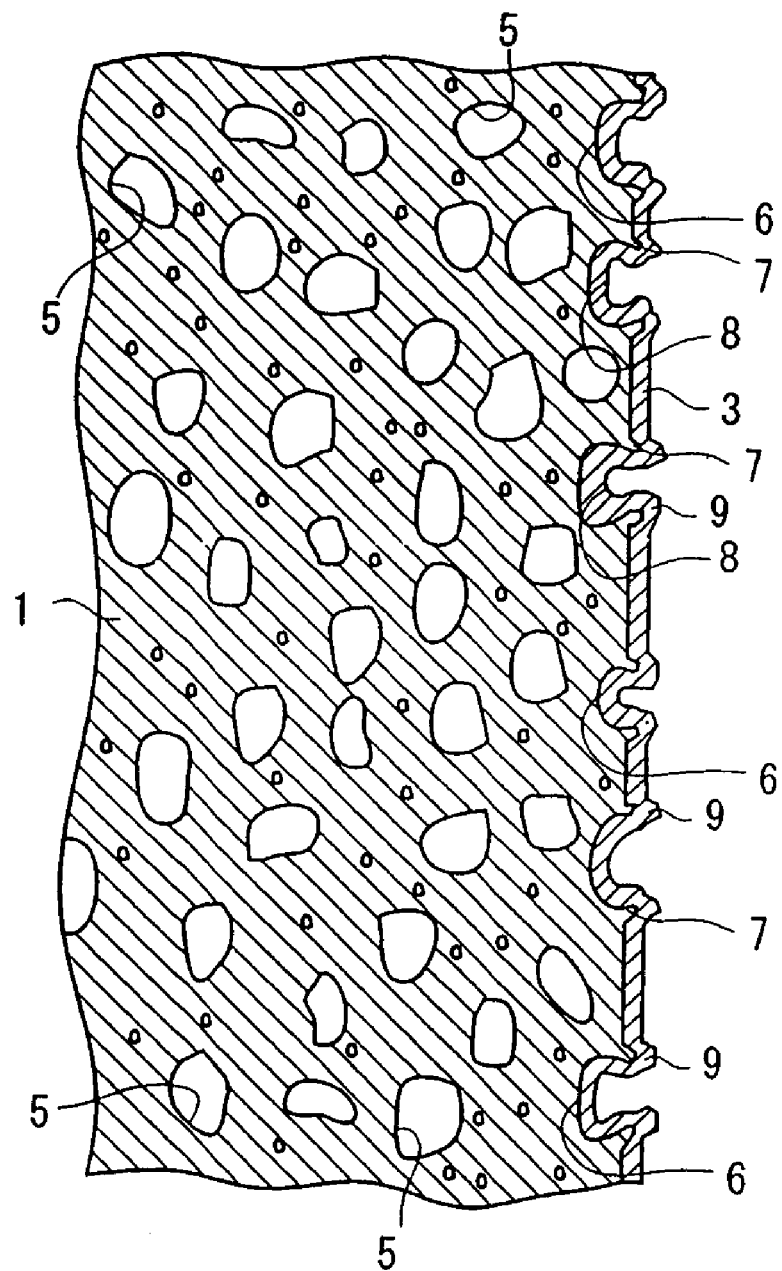
FIG. 7 is a magnified view illustrating major parts shown in FIG. 6.
Figure 8:
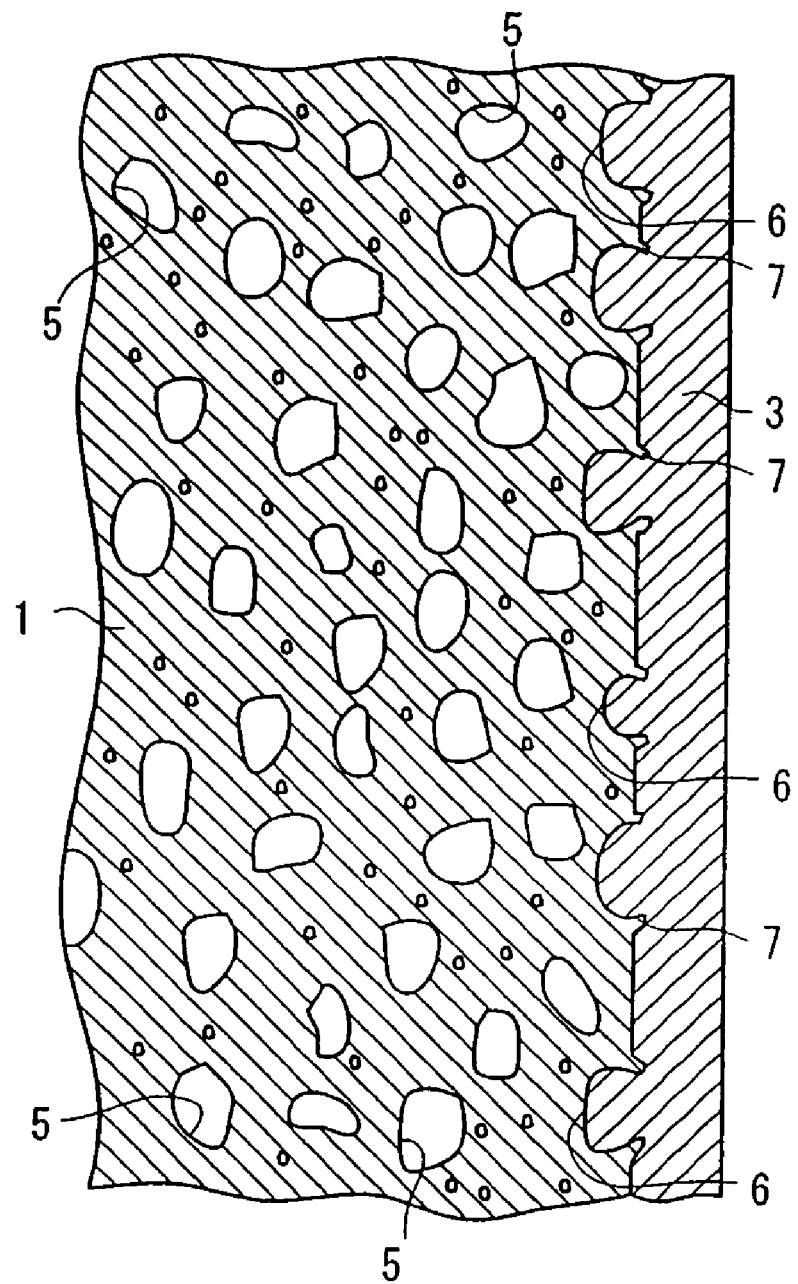
FIG. 8 is a magnified view illustrating major parts of another electrolyte-electrode joined assembly concerning the conventional technique.

The electrolyte-electrode joined assembly 18 according to the embodiment of the present invention is manufactured, for example, as follows in accordance with a flow chart shown in FIG. 5. The production method comprises a first step S1 of presintering a compact manufactured with the constitutive particles of the anode 12 to provide the anode 12, a second step S2 of providing the flattening layer 20 on one end surface of the anode 12, a third step S3 of providing the solid electrolyte 16 on the flattening layer 20, a fourth step S4 of sintering the flattening layer 20 and the solid electrolyte 16 together, and a fifth step S5 of providing the cathode 14 on the solid electrolyte 16.

At first, in the first step S1, NiO particles and YSZ particles are mixed at a volume ratio of 1:1. A binder based on, for example, polyvinyl alcohol or acrylic, and the pore-forming agent such as PMMA resin or carbon are added to the mixed particles.

Those selected as the pore-forming agent have average grain diameters such that the opening diameters of the large diameter pores 24 to be provided in the anode 12 are within a desired range. For example, when the opening diameter of the large diameter pore 24 is approximately 4 to 6 μm, the pore-forming agent having an average grain diameter of 8 μm is selected, and when the opening diameter of the large diameter pore 24 is approximately 12 to 14 μm, the pore-forming agent having an average grain diameter of 20 μm is selected.

The ratio of the addition of the pore-forming agent is set so that the porosity of the anode 12 is within a desired range. For example, when the porosity is 35%, the ratio of the addition of the pore-forming agent should be 37%.

The mixed particles as described above are dispersed in a solvent to prepare a slurry. The slurry is formed into a sheet-like compact having a thickness of about 1 mm by the doctor blade method. Further, the sheet-like compact is debinded, i.e., the binder in the sheet-like compact is removed. The pore-forming agent disappears as a result of the debinding, and the large diameter pores 24 having opening diameters corresponding to the average grain diameter of the pore-forming agent are formed at the tracing of the pore-forming agent which disappeared.

The sheet-like compact is presintered. The temperature to be retained in this process is preferably 1,100° to 1,200° C. The constitutive particles are somewhat fused as a result of the presintering, in accordance with the slight shrinkage of the anode 12.

Subsequently, in the second step S2, a slurry of NiO and YSZ, which is prepared in the same manner as described above except that the pore-forming agent is not added, is printed on one end surface of the anode 12, for example, by means of the screen printing method. When the slurry is sintered, the flattening layer 20 is formed.

The thickness of the applied slurry is set depending on the opening diameters of the large diameter pores 24. For example, when the opening diameters of the large diameter pores 24, which are provided in the electrolyte-electrode joined assembly 18 to be finally obtained, are approximately 12 to 14 μm, the slurry is applied with a thickness slightly thicker than 13 μm so that the thickness of the flattening layer 20 is 13 µm. When the slurry is applied with the thickness as described above, then the large diameter pores 24, which are open at the upper end surface of the anode 12, are filled therewith, and the projections 25, which bulge out of the upper end surface, are buried therewith. Further, the upper end surface of the slurry is flat.

Subsequently, in the third step S3, a previously prepared slurry of YSZ is printed on the slurry described above, for example, by the screen printing method.

In the fourth step S4, the slurry of NiO and YSZ and the slurry of YSZ are heated and sintered together with the anode 12. Accordingly, the flattening layer 20 composed of NiO and YSZ and the solid electrolyte 16 composed of YSZ are formed respectively. It is preferable that the sintering temperature is set, for example, to 1,400° to 1,500° C.

The large diameter pores 24 are not formed in the flattening layer 20 provided as described above, because the pore-forming agent is not added to the slurry. Therefore, the porosity is 20% which is smaller than that of the anode 12. That is, the flattening layer 20, which has a small porosity as compared with the anode 12, is formed, although the material and the composition are the same as those of the anode 12.

Subsequently, in the fifth step S5, a slurry of $La_{0.6}Sr_{0.4}MnO_3$ is applied to an exposed one end surface of the solid electrolyte 16, for example, by the screen printing method. After that, the slurry is heated at about 1,100° C. together with the anode 12, the flattening layer 20, and the solid electrolyte 16 in the air atmosphere. Thus, the cathode 14 is fired on the solid electrolyte 16. Accordingly, the electrolyte-electrode joined assembly 18, in which the solid electrolyte 16 is interposed between the anode 12 and the cathode 14 and the flattening layer 20 is disposed adjacently to the anode 12, is consequently obtained.

In order to construct the power-generating cell 10 (see FIG. 1), the separators 26a, 26b, the collecting electrodes 28a, 28b, and the end plates 30a, 30b are further arranged at the respective end surfaces of the anode 12 and the cathode 14 of the electrolyte-electrode joined assembly 18.

In the embodiment described above, the flattening layer 20, the solid electrolyte 16, and the cathode 14 are provided in this order on the anode 12. However, it is also allowable that the cathode 14 is firstly provided, and the solid electrolyte 16, the flattening layer 20, and the anode 12 are provided on the cathode 14. In the case of the electrolyte-electrode joined assembly in which gas is diffused to the cathode, it is also allowable that the flattening layer, the solid electrolyte, and the anode are provided in this order on the cathode.

The compact may be obtained, for example, by press forming to the particles, instead of the sheet-like compact with the slurry.

The material for the flattening layer is not especially limited to the same material having the same composition as that of the anode or the cathode to serve as the substrate. For example, when the anode is composed of a cermet containing YSZ and Ni at a weight ratio of 1:1, the flattening layer may be constructed with a cermet containing YSZ and Ni at a weight ratio of 3:7 or a cermet containing YSZ and Ni at a weight ratio of 7:3. Alternatively, the flattening layer may be composed of a cermet of Ni and $CeO_2$(SDC) doped with Sm.

The respective materials for the anode, the solid electrolyte, and the cathode, are not especially limited to Ni/YSZ, the perovskite type oxide, and YSZ. For example, the cathode may be constructed with fluorite type oxide.

The opening diameter of the large diameter pore 24 is not limited to the range as described above. The opening diameter of the large diameter pore 24 is changed depending on the grain diameter and the grain diameter distribution of the pore-forming agent. However, it is preferable that the opening diameter of the large diameter pore 24 is within a range of 10 to 20 µm. In this case, the thickness of the flattening layer 20 should be 10 to 20 µm.

It is also possible to form the pores without adding the pore-forming agent. For example, the porosities of the anode 12 and the flattening layer 20 may differ by controlling the temperature and the time of the presintering for the anode 12 (first electrode) and the temperature and the time of the sintering for the flattening layer 20.

Although certain preferred embodiments of the present invention have been shown and described in detail, it should be understood that various changes and modifications may be made therein without departing from the scope of the appended claims.

What is claimed is:

1. An electrolyte-electrode joined assembly comprising a solid electrolyte which is interposed between a first electrode and a second electrode, said first electrode functioning as one of an anode and a cathode, and said second electrode functioning as the other of said anode and said cathode, wherein said first electrode is a porous member which has pores for allowing a gas to flow therethrough and which has recesses and projections disposed at an end surface on a side facing said solid electrolyte, wherein said pores have opening diameters of 1 to 20 µm in a two-dimensional cross section;

a flattening layer is provided between said first electrode and said solid electrolyte, said recesses being filled therewith, said projections being buried therewith, and said flattening layer having a flat end surface on a side facing said solid electrolyte;

said flattening layer has a thickness which is set to be an average value of said opening diameters of said pores in said two-dimensional cross section, wherein said flattening layer has a thickness of 1 to 20 µm and; and said flattening layer has a porosity which is smaller than that of said first electrode.

2. The electrolyte-electrode joined assembly according to claim 1, wherein a material for said first electrode is the same as a material for said flattening layer.

3. The electrolyte-electrode joined assembly according to claim 1, wherein said opening diameters in said two-dimensional cross section of said pores is 4 to 6 µm, and said thickness of said flattening layer is 5 µm.

4. The electrolyte-electrode joined assembly according to claim 1, wherein said opening diameters in said two-dimensional cross section of said pores is 12 to 14 µm, and said thickness of said flattening layer is 13 µm.

5. The electrolyte-electrode joined assembly according to claim 1, wherein said first electrode further includes small diameter pores having opening diameters in said two-dimensional cross section of 0.5 to 1 µm.

6. The electrolyte-electrode joined assembly according to claim 1, wherein said first electrode comprises small diameter pores and large diameter pores, the large diameter pores being formed by adding a pore-forming agent and then extinguishing said pore-forming agent.

7. A method for producing an electrolyte-electrode joined assembly comprising a solid electrolyte which is interposed between a first electrode and a second electrode, said first electrode functioning as one of an anode and a cathode, and said second electrode functioning as the other of said anode and said cathode, said method comprising:

preparing a compact with particles and then presintering said compact to provide said first electrode, wherein said first electrode has pores which have opening diameters in a two-dimensional cross section of 1 to 20 µm that are formed by adding a pore-forming agent in advance to said particles as a raw material for said first electrode and extinguishing said pore-forming agent;

forming a flattening layer in a state in which a porosity of said flattening layer is smaller than that of said first electrode, wherein said flattening layer has a thickness which is set to be an average value of said opening diameters in said two-dimensional cross section of said pores, said flattening layer having a flat and exposed end surface, recesses existing at one end surface of said first electrode being filled therewith, and projections being buried therewith;

forming said solid electrolyte on said flattening layer, wherein said flattening layer has a thickness of 1 to 20 µm;

sintering said flattening layer and said solid electrolyte; and forming said second electrode on said sintered solid electrolyte.

8. The method for producing said electrolyte-electrode joined assembly according to claim 7, wherein said flattening layer is formed with a material which is the same as a material for said first electrode.

9. The method for producing said electrolyte-electrode joined assembly according to claim 7, wherein said opening diameters in said two-dimensional cross section of said pores is 4 to 6 µm, and said thickness of said flattening layer is 5 µm.

10. The method for producing said electrolyte-electrode joined assembly according to claim 7, wherein said pore-forming agent, which is used to form said pores, has an average grain diameter of 8 µm.

11. The method for producing said electrolyte-electrode joined assembly according to claim 7, wherein said opening diameters in said two-dimensional cross section of said pores is 12 to 14 µm, and said thickness of said flattening layer is 13 µm.

12. The method for producing said electrolyte-electrode joined assembly according to claim 11, wherein said pore-forming agent, which is used to form said pores, has an average grain diameter of 20 µm.

13. The method for producing said electrolyte-electrode joined assembly according to claim 7, wherein said first electrode comprises small diameter pores and large diameter pores, the large diameter pores being formed by adding a pore-forming agent and then extinguishing said pore-forming agent.

* * * * *